United States Patent
Burch

(10) Patent No.: US 10,858,269 B2
(45) Date of Patent: Dec. 8, 2020

(54) PROCESS FOR THE TREATMENT OF WATER

(71) Applicant: William Whitney Burch, Livingston, TX (US)

(72) Inventor: William Whitney Burch, Livingston, TX (US)

(*) Notice: Subject to any disclaimer, the term of this patent is extended or adjusted under 35 U.S.C. 154(b) by 90 days.

(21) Appl. No.: 15/710,782

(22) Filed: Sep. 20, 2017

(65) Prior Publication Data

US 2018/0079667 A1 Mar. 22, 2018

Related U.S. Application Data

(60) Provisional application No. 62/397,342, filed on Sep. 21, 2016.

(51) Int. Cl.
| | |
|---|---|
| *C02F 1/70* | (2006.01) |
| *C02F 1/04* | (2006.01) |
| *C25C 3/02* | (2006.01) |
| *C01D 1/04* | (2006.01) |
| *C01F 11/18* | (2006.01) |
| *C01D 7/10* | (2006.01) |
| *C01B 3/08* | (2006.01) |

(52) U.S. Cl.
CPC ............... *C02F 1/705* (2013.01); *C01B 3/08* (2013.01); *C01D 1/04* (2013.01); *C01D 7/10* (2013.01); *C01F 11/18* (2013.01); *C25C 3/02* (2013.01); *C02F 1/04* (2013.01)

(58) Field of Classification Search
CPC .... C02F 1/04; C02F 1/705; C01B 3/08; C01F 11/18; C01D 7/00; C01D 1/04; C25C 3/02
See application file for complete search history.

(56) References Cited

U.S. PATENT DOCUMENTS

| | | | | |
|---|---|---|---|---|
| 4,896,507 A * | 1/1990 | Hosford | .................. | F03G 6/065 60/641.8 |
| 2002/0006533 A1* | 1/2002 | Bergman | ................... | B01J 7/02 429/421 |
| 2006/0029893 A1* | 2/2006 | Hsu | .......................... | C25B 1/04 431/2 |
| 2009/0298141 A1* | 12/2009 | De Vries | ............ | B01D 17/0217 435/134 |
| 2010/0061923 A1* | 3/2010 | Reddy | ...................... | B01J 3/048 423/600 |
| 2010/0137457 A1* | 6/2010 | Kaplan | ............... | C07C 29/1516 518/702 |
| 2010/0154429 A1* | 6/2010 | Peters | .................. | B01D 1/0058 60/772 |
| 2013/0115139 A1* | 5/2013 | Stern | ......................... | B01J 7/02 422/112 |

* cited by examiner

*Primary Examiner* — John Kim

(57) ABSTRACT

Waste water is treated by contacting it with sodium to form hydrogen which is then contacted with air in a combustion chamber to produce clean water and heat.

11 Claims, 1 Drawing Sheet

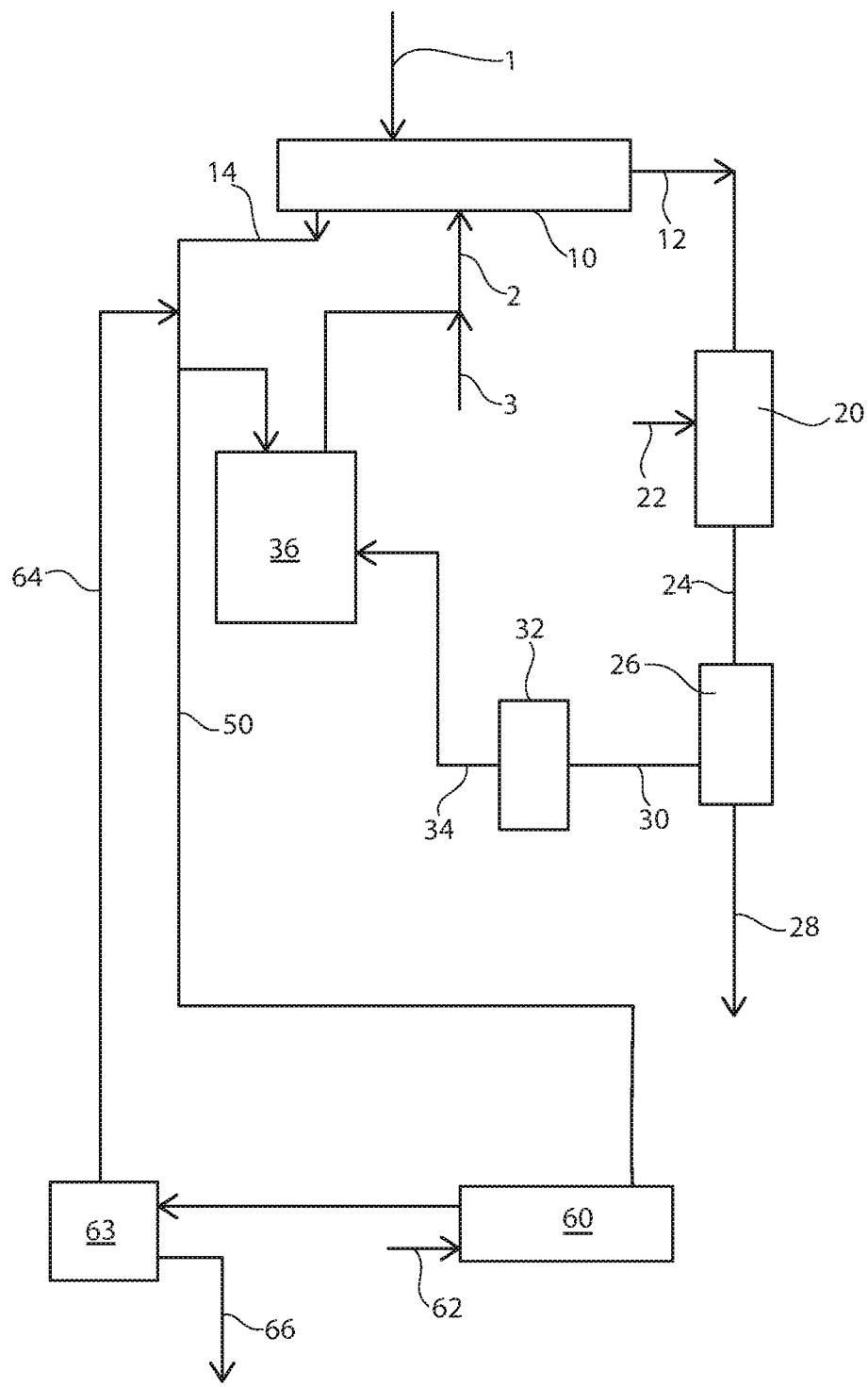

PROCESS FOR THE TREATMENT OF WATER

RELATED PRIORITY DATE APPLICATION

This application claims the benefit under 35 U.S.C. 119(e) of the U.S. provisional application No. 62/397,342 filed on Sep. 21, 2016.

TECHNICAL FIELD OF THE INVENTION

The present invention relates to the field of water treatment and, more particularly, to a process and apparatus for the treatment of waste water to convert it to clean water. Still more particularly, the present invention discloses a method and apparatus wherein waste water is safely converted to hydrogen which is then combusted to form clean water. Further, the present invention discloses a process for the removal of carbon dioxide from air utilizing a metal hydroxide produced in the treatment of the waste water.

BACKGROUND OF THE INVENTION

The increasing need for potable clean water around the world is well known. Moreover, there are many places where water such as sea water, brine water, black water, grey water or produced water from oil and gas operations is abundant but it is not suitable for drinking or other domestic uses. Accordingly, there presently exists a need to convert non potable water to potable water in places where clean water is scarce. Furthermore, in places where water is abundant, non potable water except sea water, needs to be disposed to prevent or reduce adverse environmental impact. There are presently exist methods to do so but those methods are costly or have other adverse affects. For example, production water associated with oil or gas operations may be cleaned for disposal or for other use but such cleaning operation is very costly. The most common disposal of such water is to inject of that water back into the ground. Such disposal has received media attention due to earthquakes and other adverse effects.

The adverse affects of large amounts of carbon dioxide in the atmosphere are also well known. Accordingly, there is presently a need for the removal of carbon dioxide from the air to reduce the negative impact on the environment. Processes developed involve the use of many steps and chemicals to remove and dispose the carbon dioxide. Those processes are time consuming and costly.

According to the present invention, a method and apparatus is used to treat water which is not potable or suitable for disposal to clean potable water thereby reducing environmental damage and/or providing potable water where it is scarce. Further, this method generates an alkali metal hydroxide which may be used to remove carbon dioxide from the atmosphere. The method involves simple steps and is less costly.

The present invention also discloses a novel simple method for the production of hydrogen as an alternative to the presently hydrogen production technique wherein hydrogen is generated by utilizing natural gas in steam reforming.

These and other advantages of the present invention will become apparent from the following description.

SUMMARY OF THE INVENTION

Wastewater is contacted with sodium (Na) in a reactor to generate hydrogen ($H_2$) and sodium hydroxide (NaOH). The reaction is carried out in a two liquid layer system, the first lower layer comprising a mixture of sodium hydroxide and water and the second upper layer comprising kerosene which is immiscible in water and which does not react with sodium.

Any alkali metal, other that cesium which is heavier than water, may be used in the place of sodium. Further, any other liquid which does not react with the alkali metal and which is immiscible in and lighter than water may be used in the place of kerosene.

The generated hydrogen can be contacted with air in a combustion chamber to generate steam and the steam is condensed to form clean water. The heat generated from cooling the steam can be used in a steam turbine to generate power usable in the process. Alternatively, the generated hydrogen can be used directly for various well knows uses such as hydrogen car utilization wherein the hydrogen flows through a pipeline to the hydrogen utilization locations.

The sodium hydroxide from the reactor is electrolyzed utilizing a Downs' cell to form sodium and hydroxide ions. The sodium is separated and recycled to the reactor to react again with the water to form additional hydrogen.

In an alternative embodiment of the present invention, sodium hydroxide from the reactor can be used to capture and remove carbon dioxide from air streams containing the same from industrial plants and other sources of carbon dioxide. Carbon dioxide is absorbed by an alkaline sodium hydroxide solution to produce dissolved sodium carbonate (Na2CO3). The sodium carbonate is contacted with calcium hydroxide to generate sodium hydroxide and calcium carbonate. The sodium hydroxide formed is transported to the Downs' cell for further use in the process.

The calcium carbonate is thermally decomposed to produce gaseous carbon dioxide (CO2) which may be used in various applications.

BRIEF DESCRIPTION OF THE DRAWING

The preferred exemplary embodiment of the present invention will hereinafter be described in conjunction with the appended drawing, where the sole FIGURE is a schematic representing the process of the present invention.

DETAILED DESCRIPTION OF THE INVENTION

According to the present invention, a process and an apparatus the treatment of water is disclosed. Further a process and apparatus for the removal of carbon dioxide from the air utilizing and alkali hydroxide produced in the water treatment process is disclosed.

Referring now to FIG. 1, waste water stream 1 is contacted with sodium feed 2 in a reactor 10 to generate hydrogen depicted as gas stream 12 and sodium hydroxide depicted as liquid stream 14. The reaction is carried out in a two liquid layer system, the first lower layer comprising a mixture of sodium hydroxide and water and the second upper layer comprising kerosene which is immiscible in water and which does not react with sodium.

The reaction carried out in reactor 10 is represented by reaction 1, as follows:

$$2Na + 2H_2O \rightarrow 2NaOH + H_2 \quad \text{(Reaction 1)}$$

The reaction is very exothermic and the heat generated may ignite the hydrogen. For that reason the reaction is carried out in the two liquid layer system. Further, the reaction is controlled by having sufficient amount of sodium hydroxide in the water phase.

Any other alkali metal which is lighter than water may be used in the place of sodium. Accordingly potassium, sodium, lithium, rubidium, and francium may be used to react with the water in the presence of the corresponding alkali hydroxide. Cesium may not be used because it is heavier than water. Further, any other liquid which does not react with the alkali metal and which is immiscible in and lighter than water may be used in the place of kerosene.

Stream 12 containing the generated hydrogen flows to a combustion chamber 20 wherein it is contacted with air provided by air source 22 to generate steam withdrawn as stream 24 which is cooled in cooling stage 26 to form condensed clean water 28 which is drinkable and usable in other applications wherein clean water is required. The combustion is represented by Equation 2:

$$2H_2(g) + O_2(g) \rightarrow 2H_2O(g) \quad \text{(Equation 2)}$$

The heat generated from cooling the steam in cooling stage 26 is removed via heat stream 30 and is used in a steam turbine 32 to generate power 34 usable in the apparatus as described below.

Stream 14 that contains sodium hydroxide flows to a Downs' cell 36 wherein the sodium hydroxide is liquified at a temperature of about 330° C. and voltage is applied to separate it by electrolysis to sodium and hydroxide ions. The sodium is separated and returned to reactor 10 via stream 2 to react with the water to form hydrogen. Stream 3 provides makeup sodium to reactor 10. Downs' cell is powered by power 34.

In alternative embodiment of the present invention, a stream 50 containing sodium hydroxide is used to capture and remove carbon dioxide from air streams containing the same from industrial plants and other sources of carbon dioxide. Stream 50 flows to a carbon dioxide recovery stage 60 wherein the sodium hydroxide contacts an air stream 62 containing carbon dioxide to remove the carbon dioxide and dispose it accordingly. The method is outlined by Zeman and Lackner in F. S. Zeman; K. S. Lackner (2004). "Capturing carbon dioxide directly from the atmosphere". World Resour. Rev. 16: 157-172.

In that method, carbon dioxide is absorbed by an alkaline sodium hydroxide solution to produce dissolved sodium carbonate. The absorption reaction is a gas liquid reaction depicted below (Reaction 3):

$$2NaOH(aq) + CO_2(g) \rightarrow Na_2CO_3(aq) + H_2O \quad \text{(Reaction 3)}$$

The sodium carbonate is contacted with calcium hydroxide (Ca(OH)2) to generate sodium hydroxide and calcium carbonate (CaCO3) by the reaction depicted below (Reaction 4).

$$Ca(OH)_2 + Na_2CO_3 \rightarrow 2NaOH + CaCO_3 \quad \text{(Reaction 4)}$$

The sodium hydroxide formed is transported to Downs' cell 6 via line 64 for further use in the process.

The calcium carbonate is formed as a precipitate which is filtered from solution and thermally decomposed to produce gaseous CO2 depicted by Reaction 5:

$$CaCO_3(s) \rightarrow CaO(s) + CO_2(g) \quad \text{(Reaction 5)}$$

The thermal decomposition of calcite is preferably performed in a lime kiln fired with oxygen in order to avoid an additional gas separation step. The carbon dioxide produced flows via stream 66 to a storage facility or the like and can be sold to be used in several applications such as enhanced oil recovery applications or for sequestration into depleted oil reservoirs.

Hydration of the lime (CaO) completes the cycle. Lime hydration is an exothermic reaction that can be performed with water or steam. Using water, it is a liquid/solid reaction as shown in Reaction 6:

$$CaO(s) + H_2O(l) \rightarrow Ca(OH)_2(s) \quad \text{(Reaction 6)}$$

Reactions 4, 5 and 6 are shown as taking place in stage 63 in FIG. 1.

The process described above can be used for the safe disposal of alkali metals that generated as waste or otherwise in facilities such as nuclear plants. The alkali metal waste is reacted with water as shown in Reaction 1 followed by the remaining steps described above to generate hydrogen, etc.

The following examples further illustrate the invention but are not to be construed as limitations on the scope of the invention contemplated herein.

Example 1

A piece of pure sodium was added into a graduated cylinder which had tap water and kerosene liquid above the water. Sodium was heavier than the kerosene liquid but lighter than water which caused it to float at the interface between the water and the kerosene. The reaction was not very steady or controlled. The encapsulated sodium floated up in the liquid column until it liberated off all the hydrogen and then sank back to the interface. Even though the reaction was not steady or controlled and not ideal for full scale production, the hydrogen was generated without the usual and expected fire and explosion.

Example 2

A piece of pure sodium was added into a graduated cylinder which had concentrated sodium hydroxide mixed with fresh water and liquid kerosene above the water. Because sodium is heavier than kerosene but lighter than sodium hydroxide and water mixture, it floated at the interface between them and did not go up and down. Thus, the reaction was more controlled than that in Example 1, something that was accomplished by controlling the pH of the water.

While the invention is described with respect to specific embodiments, modifications thereof can be made by one skilled in the art without departing from the spirit of the invention. The details of said embodiments are not to be construed as limitations except to the extent indicated in the following claims.

What is claimed is:

1. A process for treating waste water, comprising the step of:
   contacting the waste water with an alkali metal to form a hydrogen stream and alkali metal hydroxide; and
   combusting the hydrogen stream to produce clean water and heat;
   wherein the step of contacting the waste water with the alkali metal is carried out in a two phase liquid system which includes a lower layer comprising a mixture of alkali hydroxide and a water and an upper layer comprising a liquid which is immiscible in and lighter than water and which does not react with the alkali metal.

2. A process according to claim 1 further including the step of utilizing the heat to generate power.

3. A process according to claim 1 further including the step of electrolyzing the alkali metal hydroxide to form the alkali metal.

4. A process according to claim 1 wherein the alkali metal is sodium.

5. A process according to claim 1 further including the steps of:
   contacting the alkali metal hydroxide with an air stream containing carbon dioxide; and
   removing carbon dioxide from the air stream.

6. A process for generating hydrogen, comprising the step of contacting waste water with an alkali metal to form a hydrogen stream and alkali metal hydroxide wherein the step of contacting the waste water with the alkali metal is carried out in a two phase liquid system which includes a lower layer comprising a mixture of alkali hydroxide and a water and an upper layer comprising a liquid which is immiscible in and lighter than water and which does not react with the alkali metal.

7. A process according to claim 6 further including the step of electrolyzing the alkali metal hydroxide to form the alkali metal.

8. A process according to claim 6 wherein the alkali metal is sodium.

9. A process for the disposal of an alkali metal, comprising the step of contacting waste water with the alkali metal to form a hydrogen stream and alkali metal hydroxide wherein the step of contacting the waste water with the alkali metal is carried out in a two phase liquid system which includes a lower layer comprising a mixture of alkali hydroxide and a water and an upper layer comprising a liquid which is immiscible in and lighter than water and which does not react with the alkali metal.

10. A process according to claim 9 wherein the alkali metal is sodium.

11. A process according to claim 9 further including the steps of:
   contacting the alkali metal hydroxide with an air stream containing carbon dioxide; and
   removing carbon dioxide from the air stream.

* * * * *